United States Patent
Jeong

(10) Patent No.: US 11,391,332 B2
(45) Date of Patent: Jul. 19, 2022

(54) CLUTCH CURRENT CONTROL CIRCUIT AND ELECTRICAL CONTROL VALVE HAVING THE SAME

(71) Applicants: HYUNDAI MOTOR COMPANY, Seoul (KR); KIA MOTORS CORPORATION, Seoul (KR)

(72) Inventor: Seong-Bin Jeong, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 389 days.

(21) Appl. No.: 16/691,315

(22) Filed: Nov. 21, 2019

(65) Prior Publication Data

US 2020/0256406 A1     Aug. 13, 2020

(30) Foreign Application Priority Data

Feb. 7, 2019   (KR) .................. 10-2019-0014528

(51) Int. Cl.
| | |
|---|---|
| F16D 48/06 | (2006.01) |
| B60H 1/32 | (2006.01) |
| F16D 48/02 | (2006.01) |
| F16D 27/00 | (2006.01) |
| F16D 27/112 | (2006.01) |

(52) U.S. Cl.
CPC ......... F16D 48/064 (2013.01); B60H 1/3208 (2013.01); *F16D 27/112* (2013.01); *F16D 2027/002* (2013.01); *F16D 2048/0221* (2013.01); *F16D 2500/1022* (2013.01); *F16D 2500/10418* (2013.01); *F16D 2500/3028* (2013.01); *F16D 2500/70418* (2013.01)

(58) Field of Classification Search
None
See application file for complete search history.

(56) References Cited

U.S. PATENT DOCUMENTS

| | | | |
|---|---|---|---|
| 5,228,305 A * | 7/1993 | Vogt .................. | F02B 77/084 |
| | | | 62/133 |
| 2001/0027658 A1 | 10/2001 | Ota et al. | |
| 2010/0161134 A1 | 6/2010 | Takahashi | |

FOREIGN PATENT DOCUMENTS

| | | |
|---|---|---|
| KR | 10-0224076 B1 | 10/1999 |
| KR | 10-2011-0072361 A | 6/2011 |
| KR | 10-2013-0085334 A | 7/2013 |
| KR | 10-1458015 B1 | 11/2014 |
| KR | 10-2017-0079755 A | 7/2017 |

* cited by examiner

*Primary Examiner* — Timothy Hannon
(74) *Attorney, Agent, or Firm* — Morgan, Lewis & Bockius LLP

(57) ABSTRACT

A clutch current control circuit may include as a circuit for controlling a current of a clutch connected to a compressor, a strain gauge, wherein a resistance value of the strain gauge is varied according to the movement amount of an Electric Control Valve (ECV) shaft; a switching element of performing a switching operation by comparing a gate-source voltage determined according to a change in the resistance value of the strain gauge and the threshold voltage, and allowing a flow of a first clutch current to generate by a first switching operation state; and a resistor connected in parallel with the switching element, and allowing a flow of a second clutch current to generate by a second switching operation state of the switching element.

13 Claims, 16 Drawing Sheets

| ITEMS | CASE1 | CASE2 | CASE3 |
|---|---|---|---|
| AIR CONDITIONER LOAD | HIGH | NORMAL | LOW |
| HEATER CONTROL DETERMINATION | COMPRESSOR WORK Max | COMPRESSOR WORK Mid | COMPRESSOR WORK Min |
| ECV CURRENT CONTROL | Max | Mid | Min |
| MOVEMENT AMOUNT OF ECV SHAFT | 0mm | 2mm | 4mm |
| COMPRESSOR SWASH PLATE ANGLE (TORQUE) | Max | Mid | Min |
| R1 | 120Ω | 150Ω | 180Ω |
| R1 | 120Ω | 90Ω | 60Ω |
| $V_G = \frac{R2}{R1+R2} V_{BATT}$ | 6V | 4.5V | 3V |
| $V_G \geq V_T$ | SATISFACTION | SATISFACTION | DISSATISFACTION |
| D-S SWITCH | ON | ON | OFF |
| CURRENT FLOW | I1 | I2 | I3 |
| MAGNITUDE OF CLUTCH CURRENT | Max | Mid | Min |
| CLUTCH SUCTION FORCE | Max | Mid | Min |

FIG. 14

ECV CHARACTERISTIC CURVE (CONVENTION)

ECV CHARACTERISTIC CURVE (PRESENT DISCLOSURE)

CLUTCH CURRENT CONTROL CIRCUIT AND ELECTRICAL CONTROL VALVE HAVING THE SAME

CROSS-REFERENCE TO RELATED APPLICATION

The present application claims priority to Korean Patent Application No. 10-2019-0014528, filed on Feb. 7, 2019, the entire contents of which is incorporated herein for all purposes by this reference.

BACKGROUND OF THE DISCLOSURE

Field of the Disclosure

The present invention relates to a clutch current control circuit and an electric control valve having the same, and more particularly, to a clutch current control circuit and an electric control valve having the same, which can control a clutch current together according to the movement amount of an ECV shaft to improve the use of an excess clutch current (an excess clutch suction force), thereby improving the efficiency and the fuel efficiency of a vehicle.

Description of Related Art

In recent years, improving the efficiency of an air conditioning system for a vehicle to improve the efficiency and the fuel efficiency of the vehicle has become a big concern. A compressor, which is one of the important parts of the air conditioning system for the vehicle, needs to improve the efficiency and the fuel efficiency of the vehicle as an engine consumes a lot of power.

Therefore, the compressor mainly utilizes a variable compressor instead of a fixed compressor, and the variable compressor has low energy consumption and high efficiency characteristic as compared with the fixed compressor.

Herein, the variable compressor is a variable swash plate type compressor that changes the stroke length of a piston according to various demands for the internal air conditioning of the vehicle, and is applied as a control system of the air conditioning system for the vehicle by coupling with an Electric Control Valve (hereinafter referred to as 'ECV').

The electric control valve operated by a solenoid in the variable swash plate type compressor is configured to control the compressor of the air conditioning system for the vehicle based on a Pulse Width Modulation (PWM) input signal supplied from an external controller.

This mechanism is configured to change the swash plate angle in the compressor by increasing or reducing the pressure of a swash plate chamber by use of different pressure port functions from each other in the electric control valve.

Meanwhile, in the case of the minimum swash plate angle in the compressor, since the operating torque is small, the clutch suction force may be small, and the clutch current may be reduced.

However, conventionally, since there is no device configured for varying the clutch current, the clutch suction force is usually determined by unifying based on the maximum torque. Therefore, in the case of the minimum swash plate angle in the compressor, it operates with the minimum torque, and in the instant case, the excess clutch suction force (the excess clutch current) is used, becoming a factor to reduce the efficiency and the fuel efficiency of the vehicle.

Therefore, in the case of the minimum swash plate angle in the compressor, it is necessary to improve the efficiency and the fuel efficiency of the vehicle by reducing the excess clutch suction force (the excess clutch current).

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a clutch current control circuit and an electric control valve having the same, which controls a clutch current together according to the movement amount of an ECV shaft to improve the use of an excess clutch current (an excess clutch suction force), improving the efficiency and the fuel efficiency of a vehicle.

A clutch current control circuit according to an exemplary embodiment of the present invention, as a circuit for controlling a current of a clutch connected to a compressor, may include a strain gauge, wherein a resistance value of the strain gauge is varied according to the movement amount of an Electric Control Valve (ECV) shaft; a switching element of performing a switching operation by comparing a gate-source voltage determined according to a change in the resistance value of the strain gauge and the threshold voltage, and allowing a flow of a first clutch current to generate by a first switching operation state; and a resistor connected in parallel with the switching element, and allowing a flow of a second clutch current to generate by a second switching operation state of the switching element.

The strain gauge may include a first strain gauge disposed at the opposite side of a valve opening and closing portion of an electric control valve, and increasing in the resistance value by being tensioned as the ECV shaft moves to the valve opening and closing side; and a second strain gauge disposed at the valve opening and closing side, and reducing in the resistance value by being compressed as the ECV shaft moves to the valve opening and closing side, and the first strain gauge and the second strain gauge are connected in series with each other.

The total sum of the resistance values of the first strain gauge and the second strain gauge may be kept constant.

Any one of the first strain gauge and the second strain gauge may be replaced with a general resistor having the same resistance value regardless of the movement of the ECV shaft.

The gate-source voltage of the switching element can correspond to a voltage between the first strain gauge and the second strain gauge, and may be determined by the resistance value of the first strain gauge and the resistance value of the second strain gauge.

The switching element may be an N-channel enhancement MOSFET.

The first switching operation state can indicate that in the switching element, the gate-source voltage is the threshold voltage or more in a saturation region, and a D-S switch is in an on state, and the second switching operation state can indicate that in the switching element, the gate-source voltage is smaller than the threshold voltage in the saturation region, and the D-S switch is in a cut-off state.

The current value of the first clutch current may be changed according to the magnitude of the gate-source voltage.

The clutch current control circuit can further include a battery for supplying a driving voltage necessary for the operation of the switching element, and the second clutch current may be determined by the relationship between the resistor and the driving voltage.

The current value of the second clutch current may be the minimum value in comparing with the current value of the first clutch current.

The second clutch current may be a current applied to a coil of the clutch when the compressor is the minimum swash plate angle.

The strain gauge may be mounted by integrating inside an electric control valve, and the switching element and the resistor may be mounted to an external clutch current applying portion of the electric control valve.

The present invention can control the clutch current together according to the movement amount of the ECV shaft to improve the use of the excess clutch current (the excess clutch suction force), improving the efficiency and the fuel efficiency of the vehicle.

Furthermore, the present invention can dispose the switching element and the resistor of the clutch current control circuit in the clutch current applying portion without configuring by integrating in the electric control valve, improving the degree of freedom of the compressor itself.

Furthermore, the present invention has no need to add the signal for the clutch current control by maintaining the 3-pin connector of the clutch type external variable compressor as it is.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 14 is a diagram explaining the characteristic for each case of FIG. 11 and FIG. 12.

Figure 1:
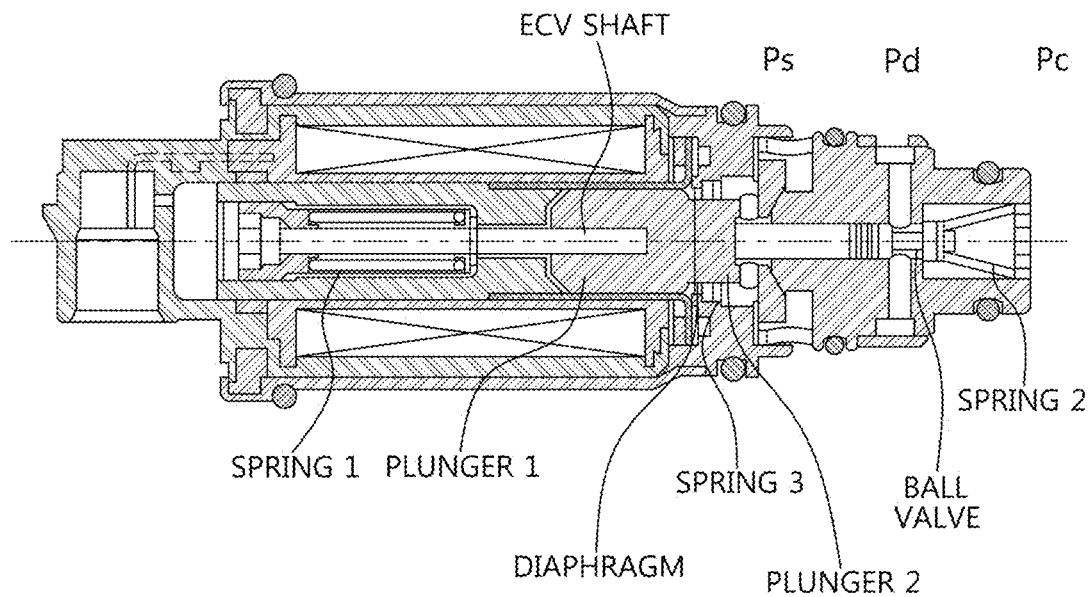
FIG. 1 is a diagram illustrating an electric control valve.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Therefore, the exemplary embodiments described in the exemplary embodiment and the configurations illustrated in the drawings are merely an exemplary embodiment of the present invention, and not intended to represent all of the technical spirits of the present invention. Therefore, it may be understood that various equivalents and modifications may be substituted for those at the time of filing the present application.

Some elements are exaggerated, omitted, or schematically illustrated in the accompanying drawings, and actual sizes of respective elements are not necessarily represented in the drawings. The present invention is not limited by relative sizes or distances illustrated in the accompanying drawings.

In the entire specification, when a certain portion "includes" a certain component, this means that the other components are excluded, but may be further included unless specially described otherwise. Furthermore, when a certain portion is "connected" to another portion, it may be "directly connected" or "electrically connected" with other elements interposed therebetween. The singular forms include the plural forms unless the context clearly indicates otherwise. It will be understood that the terms "includes" or "includes" specify the presence of features, integers, steps, operations, elements, components, or a combination thereof described in the exemplary embodiment, but do not preclude the presence or addition of one or more other features, integers, steps, operations, elements, components, or a combination thereof.

Hereinafter, various exemplary embodiments of the present invention will be described in detail with reference to the accompanying drawings so that those skilled in the art can easily practice the present invention. However, the present invention may be implemented in various different forms, and is not limited to the exemplary embodiments described herein. As such, in the drawings, to clearly describe the present invention, portions which are not related to the description of the present invention are omitted, and similar portions are denoted by similar reference numerals in the entire specification.

Hereinafter, exemplary embodiments of the present invention will be described with reference to the accompanying drawings.

Figure 2:
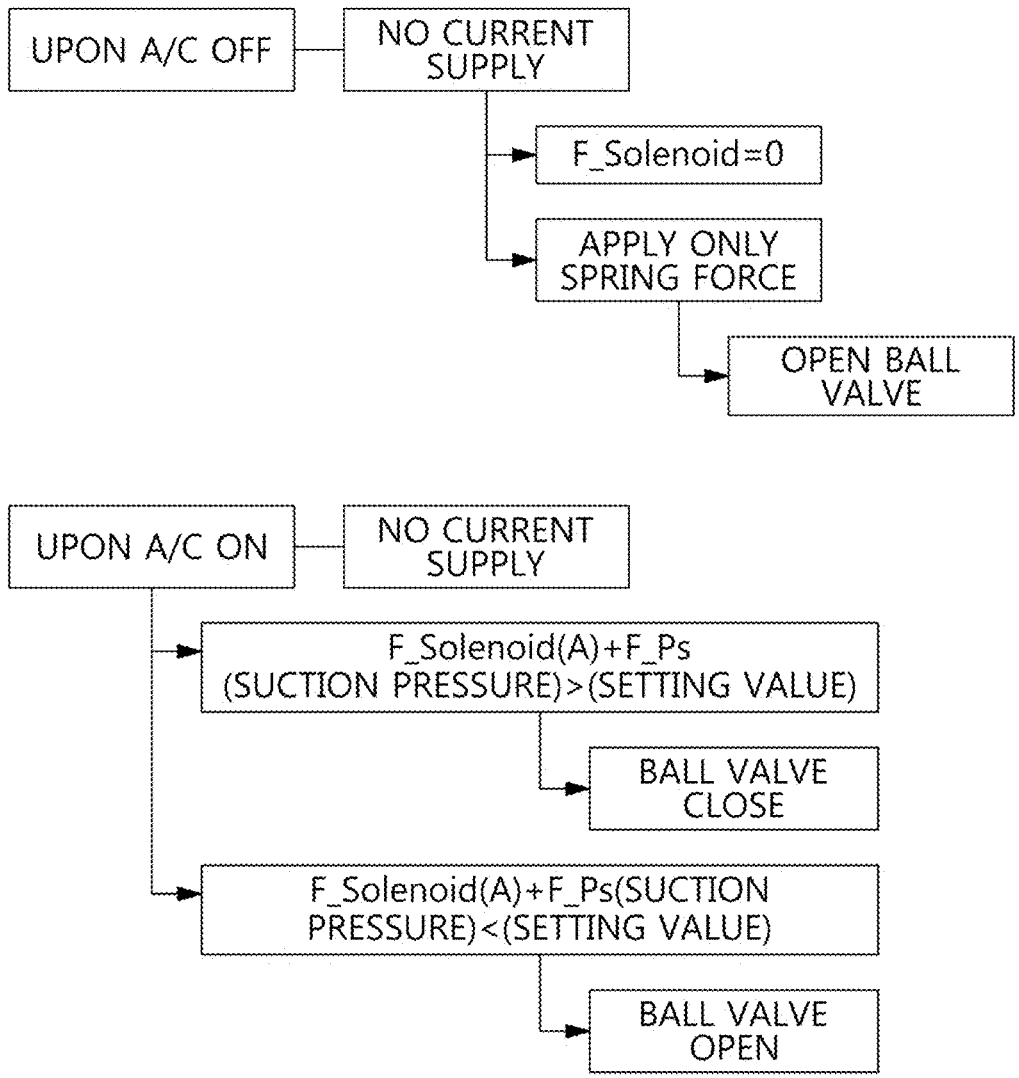
FIG. 2 is a diagram explaining the operating principle of the electric control valve of FIG. 1.
Figure 3:
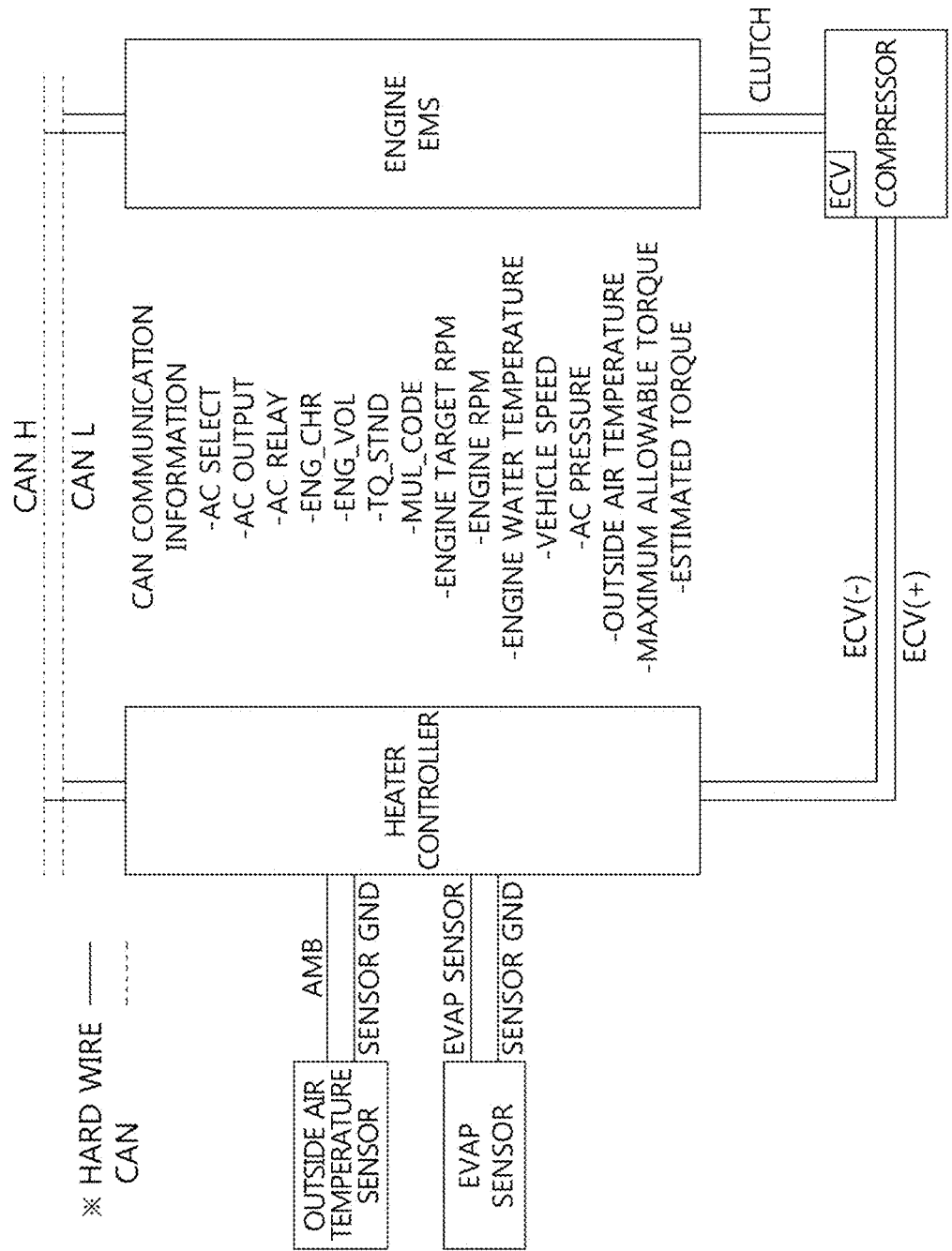
FIG. 3 is a diagram explaining the control principle of the electric control valve of FIG. 1.

FIG. 1 is a diagram illustrating an electric control valve, FIG. 2 is a diagram explaining the operating principle of the electric control valve of FIG. 1, and FIG. 3 is a diagram explaining the control principle of the electric control valve of FIG. 1.

Referring to FIG. 1, an Electric Control Valve (hereinafter used with 'ECV') is formed with the pressure ports of a suction port Ps, a crankcase port Pc, and a discharge port Pd. The pressure port functions as a passage for the air/refrigerant flow operation through the electric control valve.

The electric control valve controls the size of a ball valve with the direction of the structural forces of the springs 1, 2, 3 and the refrigerant pressures and the magnetic force with respect to the operating current of a solenoid. Herein, the size of the ball valve is the size of a hole between the discharge port Pd and the crankcase port Pc.

That is, when a current is applied to the electric control valve, a plunger assembly starts to move to generate the solenoid force, and the electric control valve controls the air/refrigerant flow rate for the air conditioning control procedure with each pressure port.

Referring to FIG. 2, when the air conditioning system A/C is in an off state, the solenoid force is not generated because there is no current supply, and only the spring force operates to open the valve (i.e., Normal Open).

As such, when the air conditioning system A/C is in an on state, the valve is closed when the resultant force of the solenoid force and the refrigerant low pressure (the suction force) of the suction port Ps is equal to or greater than the setting value, and the valve is opened in the opposite case.

Referring to FIG. 3, the refrigerant high pressure of the discharge port Pd may be detected through a refrigerant pressure sensor, but the refrigerant low pressure (the suction force) of the suction port Ps is detected through the structure in the electric control valve because there is no the refrigerant pressure sensor. That is, a heater controller performs the current control of the electric control valve for opening and closing the ball valve to receive various sensors and signals to determine the estimated torque to control like the electric control valve characteristic curve of FIG. 4, which will be described later.

Furthermore, a compressor can receive the refrigerant in a low-pressure gaseous state through an evaporator, and convert the received refrigerant into a high-temperature and high-pressure gas. The high-temperature and high-pressure gas is transferred to a condenser.

As such, the clutch is connected to the compressor, and the power of the engine may be transferred to the compressor according to the control of the heater controller so that the compressor operates, or the power transferred to the compressor may be cut-off so that the operation of the compressor stops.

Figure 4:
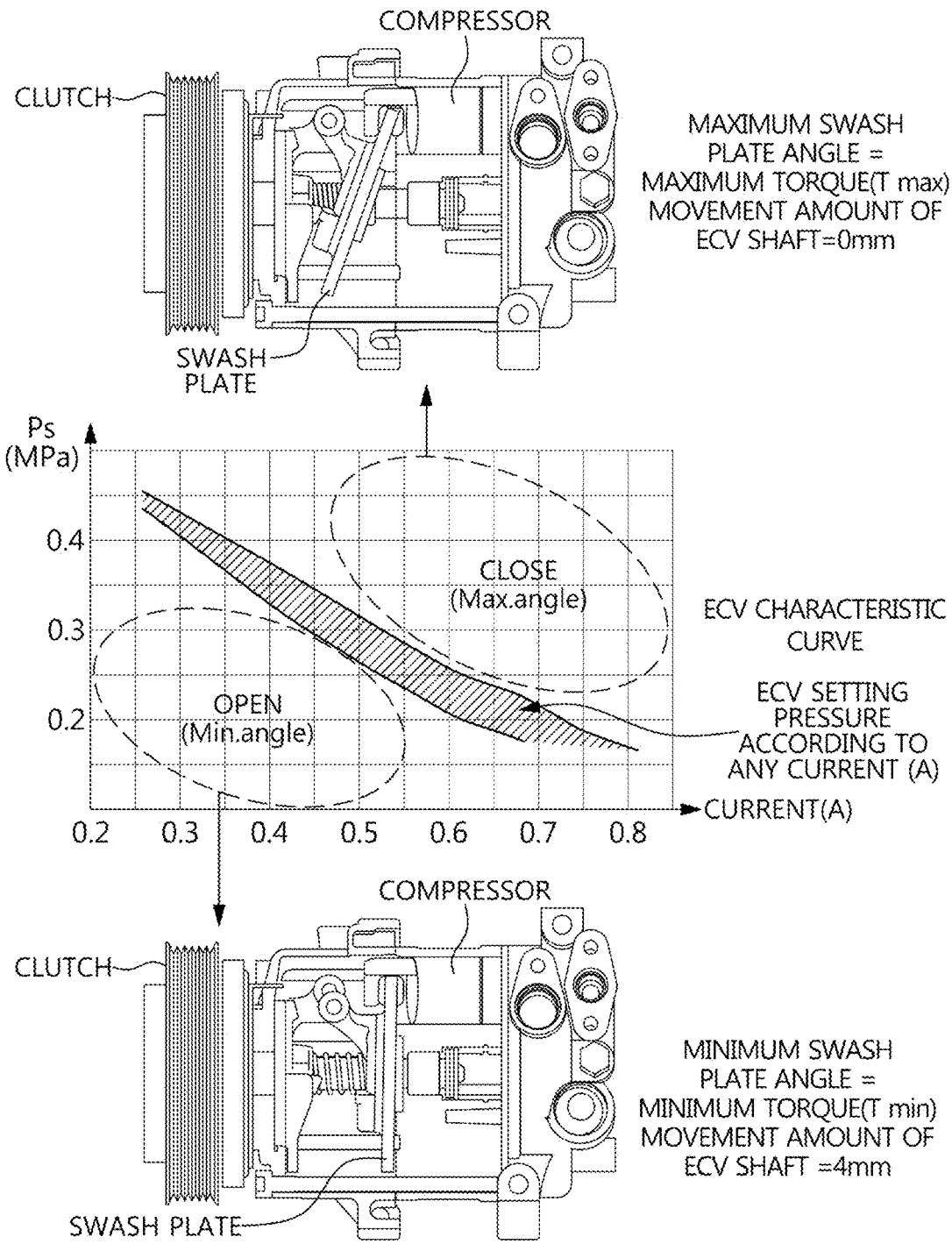
FIG. 4 is a diagram explaining the relationship between the magnitude of the compressor torque and the movement of the ECV shaft in an ECV characteristic curve.

FIG. 4 is a diagram explaining the relationship between the magnitude of the compressor torque and the movement of the ECV shaft in the electric control valve characteristic curve.

According to the ECV characteristic curve, the movement amount of 0 to 4 mm of the ECV shaft generates according to the refrigerant low pressure (i.e., the suction force) of the suction port Ps and the operating current of the solenoid. Therefore, the compressor swash plate angle is controlled between the maximum swash plate angle and the minimum swash plate angle according to the movement amount of the ECV shaft.

That is, when the ball valve of the electric control valve is closed, the swash plate in the compressor has the maximum swash plate angle, and the compressor generates the maximum torque Tmax. At the instant time, the movement amount of the ECV shaft is 0 mm. Furthermore, when the ball valve of the electric control valve is open, the swash plate in the compressor has the minimum swash plate angle, and the compressor generates the minimum torque Tmin. At the instant time, the movement amount of the ECV shaft is 4 mm. As such, in the shaded region of FIG. 4, the electric control valve controls the compressor torque by varying the compressor swash plate angle to the approximately middle thereof.

Figure 5:
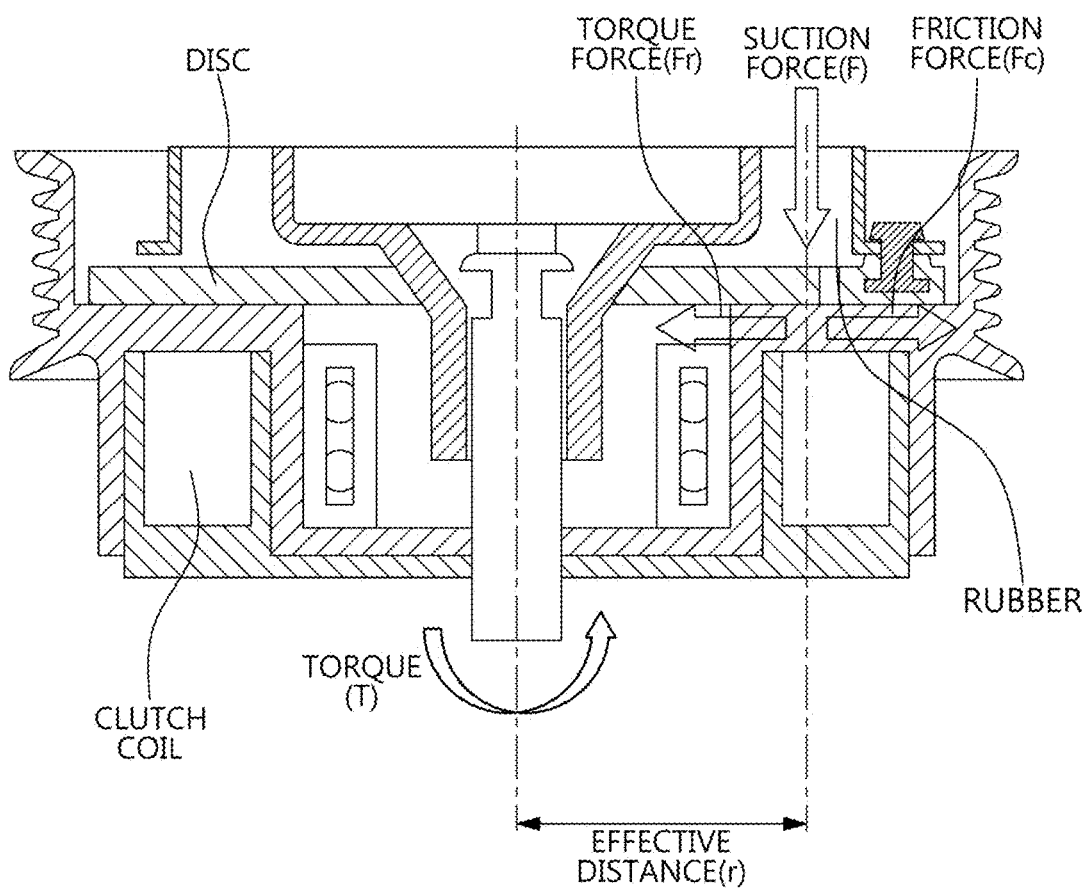
FIG. 5 and FIG. 6 are diagrams explaining the operation of the clutch.
Figure 6:
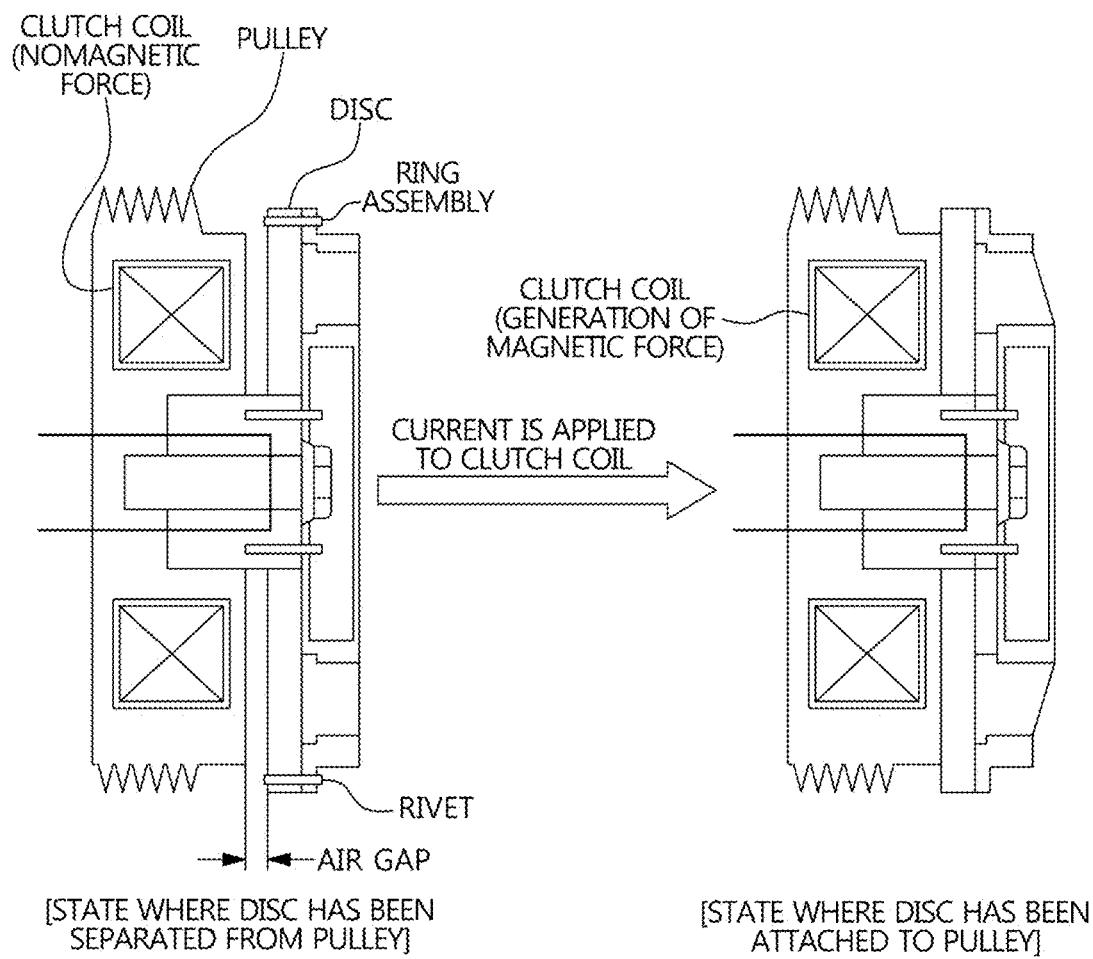
Figure 7:
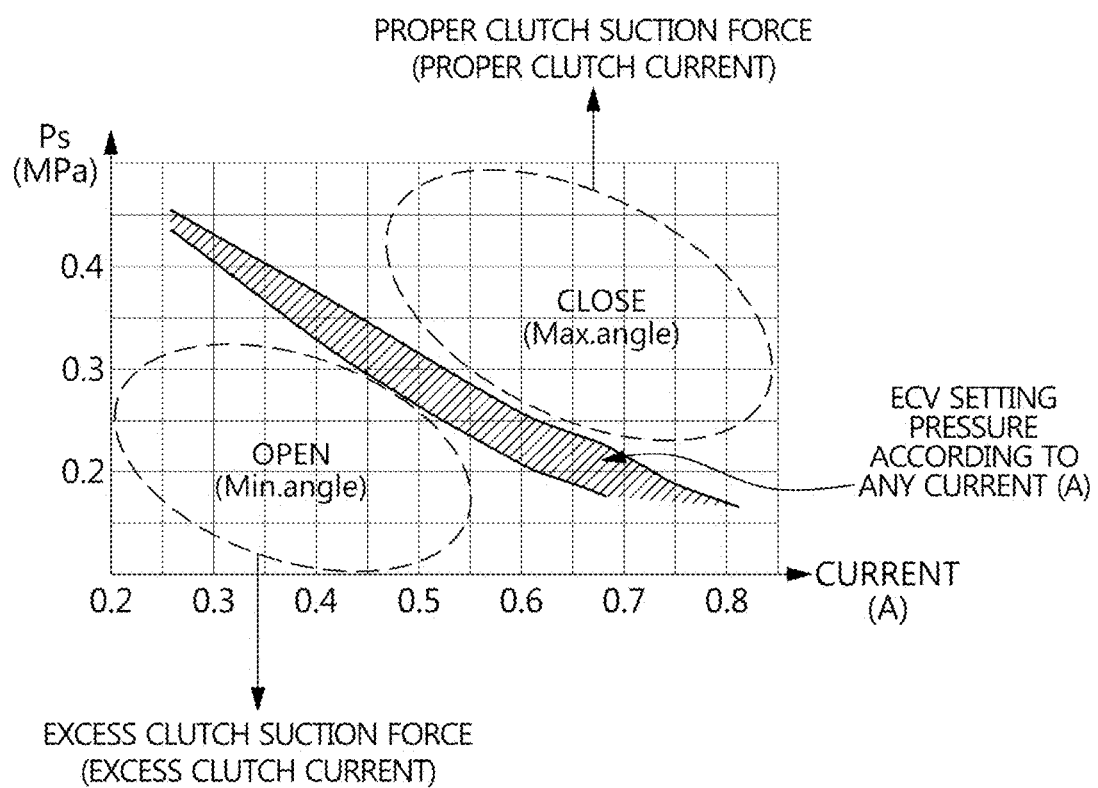
FIG. 7 is a diagram explaining the relationship between the magnitude of the compressor torque and the clutch suction force.

FIG. 5 and FIG. 6 are diagrams explaining the operation of a clutch, and FIG. 7 is a diagram explaining the relationship between the magnitude of the compressor torque and the clutch suction force.

Referring to FIG. 5 and FIG. 6, since the clutch utilizes only a predetermined coil (resistor R), only the operating current I (i.e., the clutch current) set in the coil flows when a predetermined voltage (e.g., 12V) is applied thereto.

As such, as the disc is attached to a pulley by a predetermined magnetic force generated when the operating current is applied to the coil, the clutch transfers the rotational driving force of the pulley to a compressor shaft. As such, as the disc is separated from the pulley when the operating current is not applied to the coil, the clutch does not transfer the rotational driving force of the pulley to the compressor shaft.

Herein, the clutch suction force F means an attraction force that attaches the disc to the pulley by the predetermined magnetic force generated by applying the operating current to the coil. The clutch suction force is proportional to the square of the operating current I (i.e., $F \propto I^2$), and is constant because the magnitude of the operating current applied to the coil does not change.

In FIG. 5, the clutch suction force F generates the disc friction force Fc (i.e., $Fc=\mu \times F$, and $\mu$ is the friction coefficient), and the disc friction force Fc is set to be greater than the force Fr at which the compressor torque T generates in the effective distance r (i.e., Fc>Fr). Herein, it becomes Fr=T/r.

As described above, since the clutch suction force utilizes a predetermined clutch coil, and a predetermined operating current is applied, a force of the same magnitude operates in any region of the ECV characteristic curve of FIG. 7.

That is, the clutch current is applied at the same magnitude of the current regardless of whether the compressor operates at the maximum swash plate angle (i.e., the maximum torque operation of the compressor), or at the minimum swash plate angle (i.e., the minimum torque operation of the compressor) in the ECV characteristic curve. In the instant case, the clutch suction force generates at the same magnitude regardless of the case where the compressor operates at the maximum swash plate angle or the minimum swash plate angle. Herein, the magnitude of the clutch current is determined based on the case where the compressor operates at the maximum swash plate angle (i.e., the maximum torque operation of the compressor).

However, when the compressor operates at the minimum swash plate angle, the compressor operates at the minimum torque, such that the clutch suction force may be small. That is, in the instant case, it is not a problem even if the clutch current is reduced. In the instant case, it may be seen that the excess clutch suction force (the excess clutch current) is applied conventionally.

Hereinafter, the clutch current control circuit and the electric control valve using the same will be described in detail with reference to FIGS. 8 to 12, which will be described later.

Figure 8:
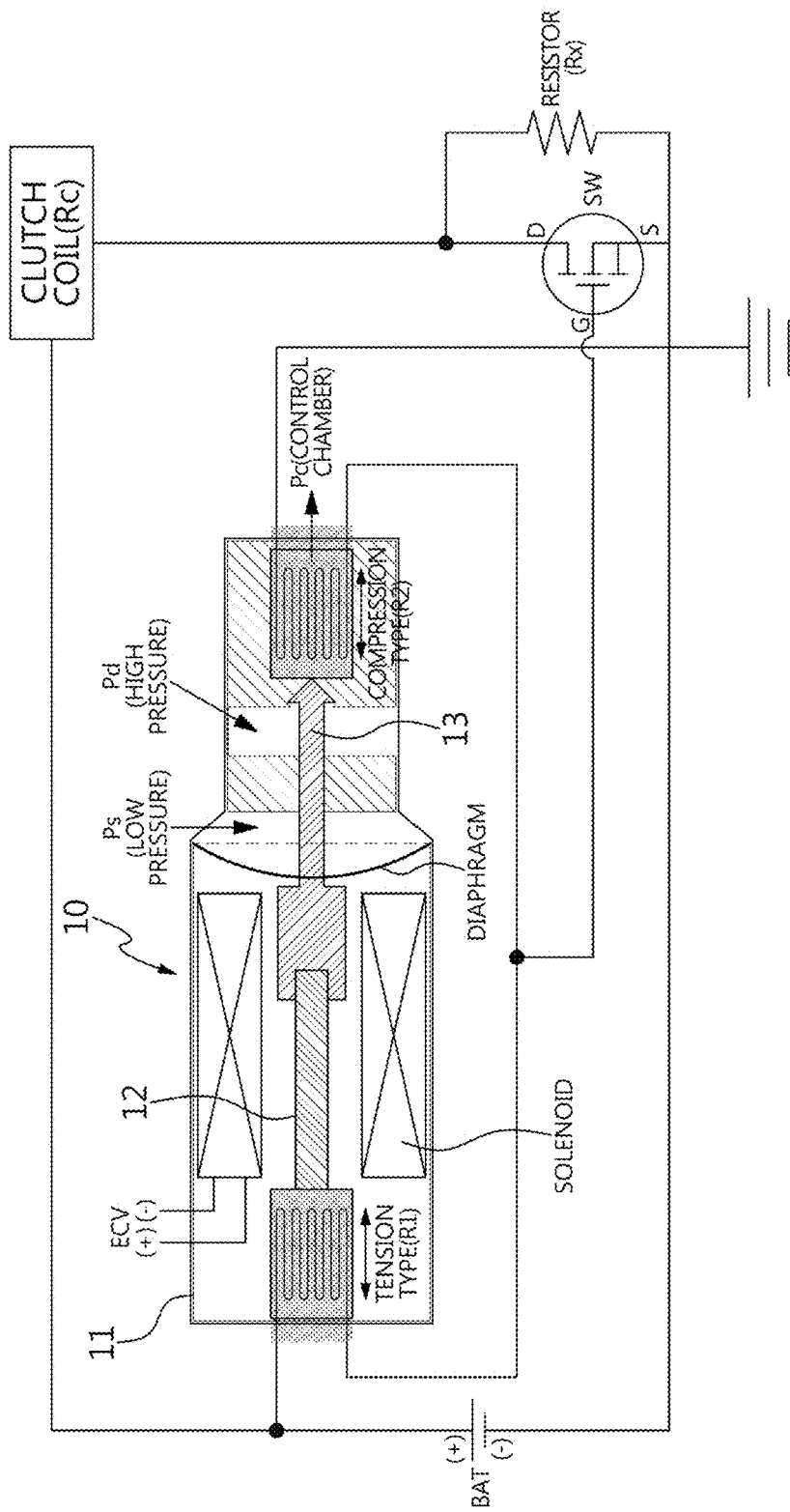
FIG. 8 is a diagram illustrating the electric control valve using a clutch current control circuit according to an exemplary embodiment of the present invention.
Figure 9:
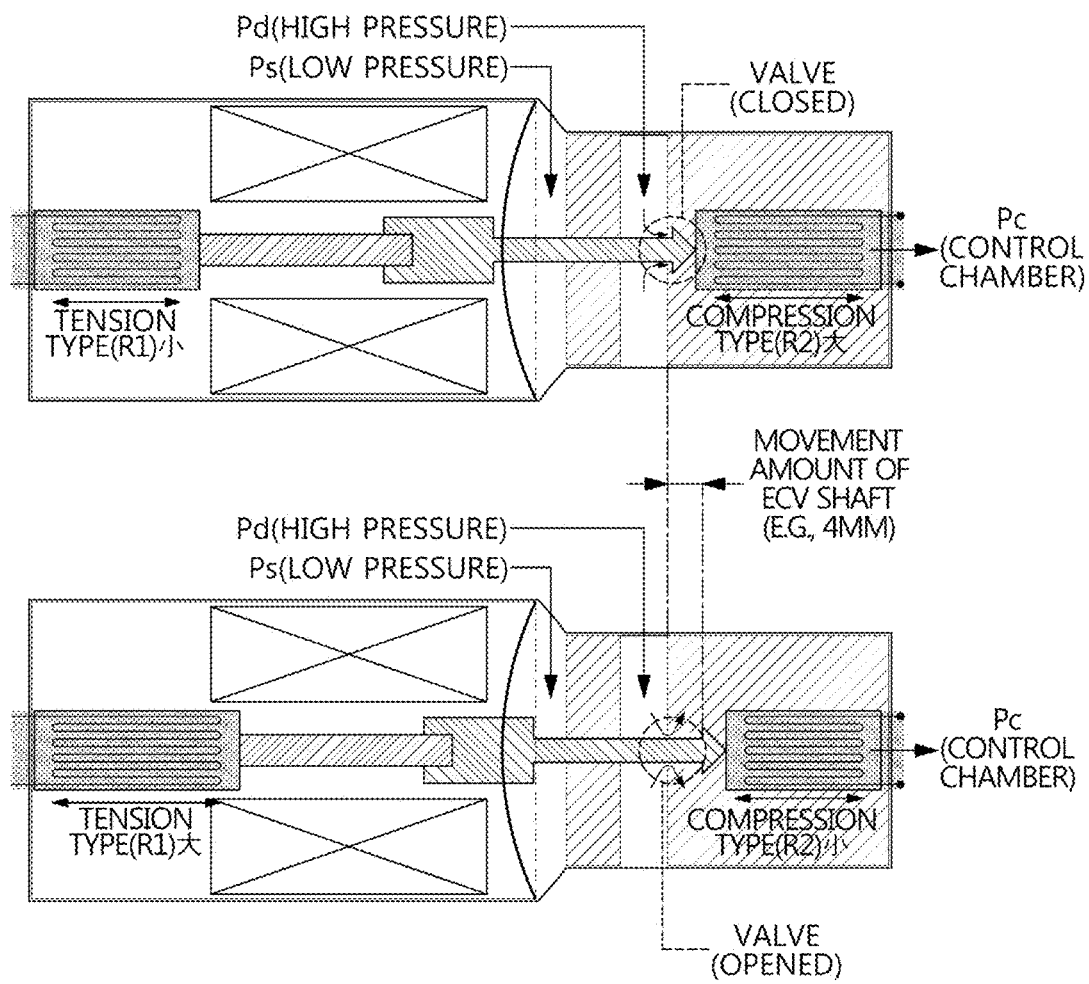
FIG. 9 is a diagram explaining a change in the resistance values of a first strain gauge and a second strain gauge according to the movement amount of the ECV shaft of FIG. 8.
Figure 10:
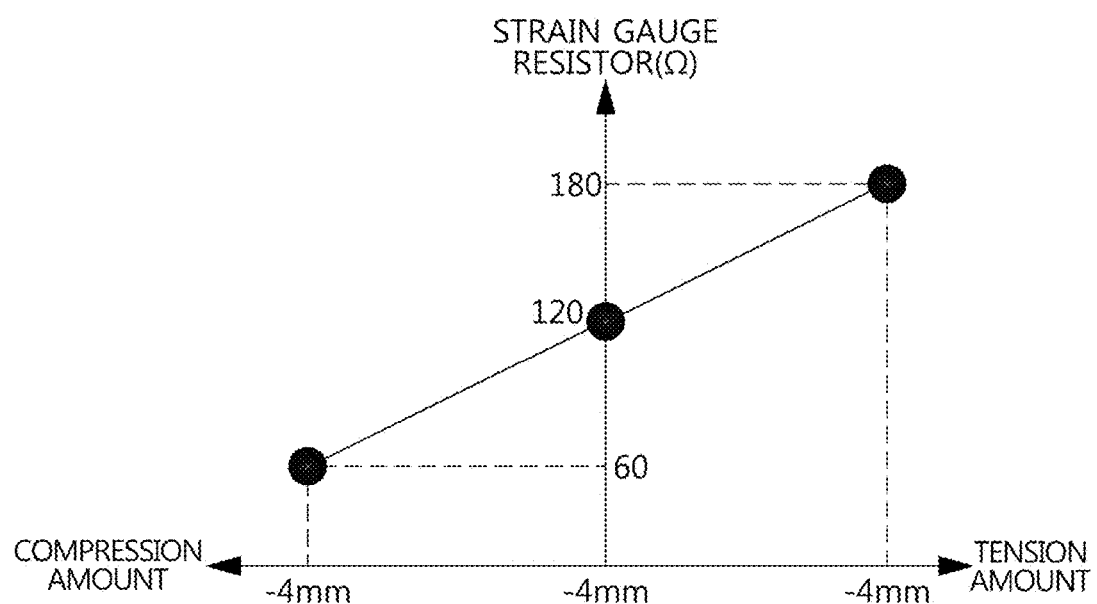
FIG. 10 is a diagram illustrating a change in the resistance value according to the tension amount and the compression amount of the strain gauge.
Figure 11:
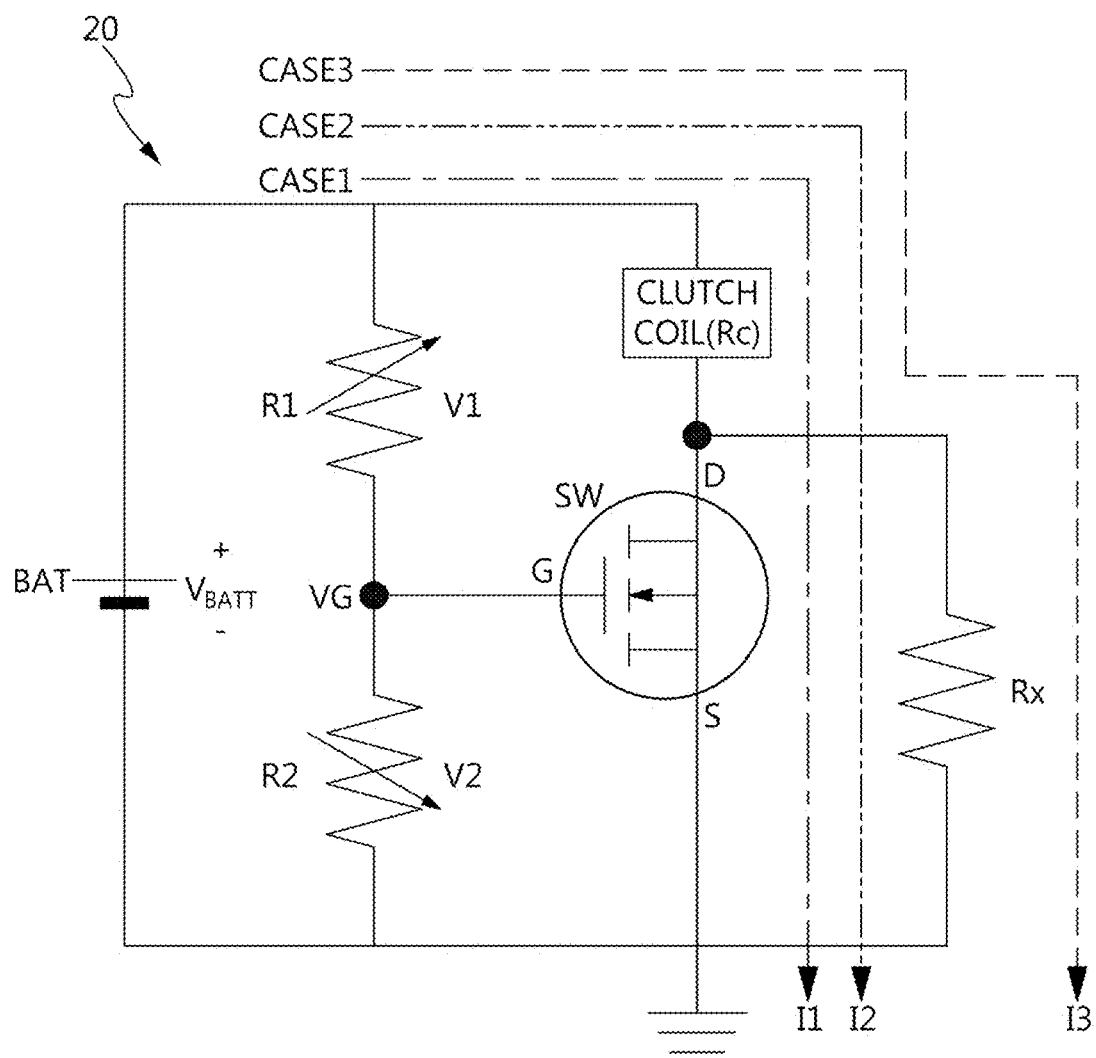
FIG. 11 is a diagram illustrating the clutch current control circuit of FIG. 8.
Figure 12:
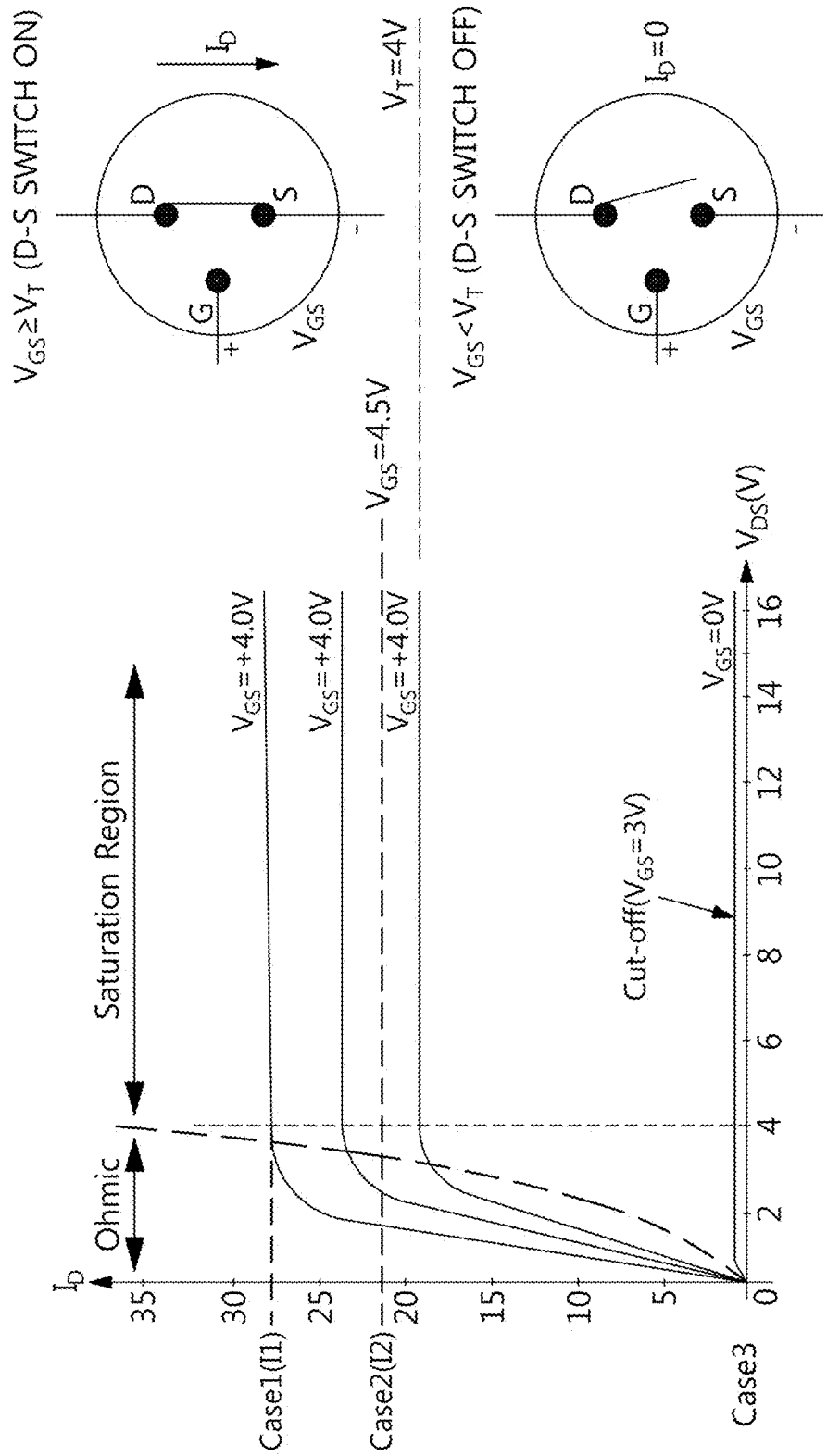
FIG. 12 is a diagram explaining the switching operation characteristic of the switching element.

FIG. 8 is a diagram illustrating an electric control valve using a clutch current control circuit according to an exemplary embodiment of the present invention, FIG. 9 is a diagram explaining a change in the resistance values of a first strain gauge and a second strain gauge according to the movement amount of the ECV shaft of FIG. 8, FIG. 10 is a diagram illustrating a change in the resistance value according to the tension amount and the compression amount of the strain gauge, FIG. 11 is a diagram illustrating the clutch current control circuit of FIG. 8, and FIG. 12 is a diagram explaining the switching operation characteristic of a switching element.

Referring to FIGS. 8 to 12, the clutch current control circuit according to an exemplary embodiment of the present invention includes a first strain gauge R1, a second strain gauge R2, a switching element SW, a resistor Rx, and a battery BAT.

First, the other end portion of the first strain gauge R1 and one end portion of the second strain gauge R2 are connected in series with each other. Herein, one end portion of the first strain gauge R1 is connected to the (+) end portion of the battery BAT, and the other end portion of the second strain gauge R2 is connected to the (−) end portion of the battery BAT.

As such, the switching element SW has the connection end portion of a drain, a gate, and a source.

The drain of the switching element SW is connected to one end portion of the first strain gauge R1 through a clutch coil Rc. That is, one end portion of the clutch coil Rc is connected to the drain of the switching element SW, and the other end portion of the clutch coil Rc is connected to one end portion of the first strain gauge R1.

The current flowing through the clutch coil Rc (i.e., the clutch current) varies in size according to the switching operation state of the switching element SW. Herein, the switching operation state may be divided into the case where the gate-source voltage $V_{GS}$ is equal to or greater than the threshold voltage $V_T$ (i.e., a first switching operation state) and the case where the gate-source voltage $V_{GS}$ is smaller than the threshold voltage $V_T$ (i.e., a second switching operation state).

Furthermore, the gate of the switching element SW is connected between the first strain gauge R1 and the second strain gauge R2, and the source of the switching element SW is grounded.

Next, the resistor Rx is connected in parallel with the switching element SW, and has one end portion connected to the drain of the switching element SW and has the other end portion grounded.

As such, the battery BAT supplies the driving voltage $V_{BATT}$ necessary for the operation of the switching element SW.

Meanwhile, an electric control valve 10 using the clutch current control circuit according to an exemplary embodiment of the present invention mounts the first strain gauge R1 and the second strain gauge R2 at both end portions between an ECV housing 11 and an ECV shaft 12, respectively, and varies the resistance values of the first strain gauge R1 and the second strain gauge R2 according to the movement of the ECV shaft 12.

The first strain gauge R1 is formed of a resistor and is mounted at the opposite side of a valve opening and closing portion 13, and the resistance value varies through the physical deformation that elongates according to the movement amount of the ECV shaft 12. Herein, the first strain gauge R1 functions as the tension type in which the resistance value increases through the physical deformation that elongates according to the movement amount of the ECV shaft 12.

As such, the second strain gauge R2 is a thin compression type gauge formed of a resistor and is mounted at the valve opening and closing side, and the resistance value varies through the physical deformation compressed (shrunk) according to the movement amount of the ECV shaft 12. Herein, the second strain gauge R2 functions as the compression type in which the resistance value reduces through the physical deformation that shrinks according to the movement amount of the ECV shaft 12.

As in FIG. 9 and FIG. 10, the first strain gauge R1 and the second strain gauge R2 are the same strain gauge, and the resistance values vary according to the tension amount and the compression amount.

The resistance values of the first strain gauge R1 and the second strain gauge R2 can vary as in Table 1 according to the movement amount of the ECV shaft 12.

TABLE 1

| Items | Movement amount 0 mm | Movement amount 2 mm | Movement amount 4 mm |
|---|---|---|---|
| First strain gauge (tension type) | 120 Ω | 150 Ω (2 mm elongated) | 180 Ω (4 mm elongated) |
| Second strain gauge (compression type) | 120 Ω | 90 Ω (2 mm shrunk) | 60 Ω (4 mm shrunk) |

Referring to Table 1, although the first strain gauge R1 and the second strain gauge R2 have the same resistance value when the ECV shaft 12 does not move, they can have the complementary relationship in which when the resistance value of one side increases as the ECV shaft 12 moves, the resistance value of the other side thereof reduces.

The first strain gauge R1 and the second strain gauge R2 are connected in series with each other, and the total sum (i.e., R1+R2) of the resistance values of the first strain gauge R1 and the second strain gauge R2 is kept constant regardless of the movement of the ECV shaft 12.

However, any one of the first strain gauge R1 and the second strain gauge R2 may be replaced with a general resistor having the same resistance value regardless of the movement of the ECV shaft 12. However, in the instant case, the resistance values at both sides thereof do not have the complementary relationship therebetween, and the total sum of the resistance values is also not kept constant regardless of the movement of the ECV shaft 12.

Herein, when the first strain gauge R1 and the second strain gauge R2 are applied together, the change sensitivity of the gate voltage $V_G$ with respect to the fine movement of the ECV shaft 12 may be amplified.

Furthermore, one end portion of the first strain gauge R1 is connected to the (+) electrode of the battery BAT, the other end portion of the first strain gauge R1 and one end portion of the second strain gauge R2 are connected in series with each other, and the other end portion of the second strain gauge R2 is connected to the (−) electrode of the battery BAT.

Therefore, the driving voltage $V_{BATT}$ of the battery BAT is, for example, 12V and is divided according to the resistance values of the first strain gauge R1 and the second strain gauge R2. The first strain gauge R1 is applied with a first voltage V1, and the second strain gauge R2 is applied with a second voltage V2. Herein, the gate G of the switching element SW is connected between the first strain gauge R1 and the second strain gauge R2.

The gate voltage $V_G$ of the switching element SW is a voltage between the first strain gauge R1 and the second strain gauge R2 as in the following Equation 1, and may be determined by the resistance values of the first strain gauge R1 and the second strain gauge R2. The gate voltage $V_G$ is related to the gate-source voltage $V_{GS}$ of the switching element SW. Herein, since the source side of the switching element SW is grounded, the gate-source voltage $V_{GS}$ corresponds to the gate voltage $V_G$.

$$V_G = \frac{R_2}{R_1 + R_2} V_{BATT} \qquad \text{Equation 1}$$

Herein, the switching element SW can use four combinations of MOSFETs of N-channel or P-channel/enhancement or depletion, but preferably as an N-channel enhancement MOSFET, performs the switching operation according to the switching operation characteristic illustrated in FIG. 12.

Referring to FIG. 12, in the switching element SW, a D-S switch is in an ON state when the gate-source voltage $V_{GS}$ is equal to or greater than the threshold voltage $V_T$ (i.e., $V_{GS} \geq V_T$, the so-called first switching operation state) in a saturation region (i.e., $V_{DS} > 4V$), and the current value of the current $I_D$ flowing through the D-S switch is changed according to the magnitude of the gate-source voltage $V_{GS}$. Herein, when the gate-source voltage $V_{GS}$ is smaller than the threshold voltage $V_T$ (i.e., $V_{GS} < V_T$, the so-called second switching operation state), the D-S switch is in a cut-off state. That is, the current value of the current $I_D$ flowing through the D-S switch becomes '0A'.

As described above, the first or second switching operation state of the switching element SW is determined by comparing the gate-source voltage $V_{GS}$ and the threshold voltage $V_T$. Therefore, the switching element SW allows the flow of the clutch current to generate by the first switching operation state, and the resistor Rx allows the flow of the clutch current to generate by the second switching operation state.

As described above, the gate-source voltage $V_{GS}$ of the switching element SW corresponds to the gate voltage $V_G$, and is determined by the resistance values of the first strain gauge R1 and the second strain gauge R2 as in the Equation 1, and as described above, the resistance values of the first strain gauge R1 and the second strain gauge R2 are determined by the movement amount of the ECV shaft 12.

Furthermore, the clutch coil Rc is directly connected to the drain side of the switching element SW. The clutch current is changed according to the magnitude of the gate-source voltage $V_{GS}$ of the switching element SW when the D-S switch of the switching element SW is in an on state (i.e., $V_{GS} \geq V_T$).

Referring to FIG. 11 and FIG. 12, when the gate-source voltage $V_{GS}$ is '6V', the current value of the current $I_D$ flowing through the D-S switch of the switching element SW is 'I1', and 'I1' becomes the current value of the clutch current (Case 1, the first switching operation state).

Furthermore, when the gate-source voltage $V_{GS}$ is '4.5V', the current value of the current $I_D$ flowing through the D-S switch of the switching element SW is 'I2', 'I2' becomes the current value of the clutch current (Case 2, the first switching operation state).

As described above, the current value of the clutch current may be changed according to the magnitude of the gate-source voltage $V_{GS}$ in the first switching operation state. Herein, I1>I2 is satisfied.

On the other hand, when the gate-source voltage $V_{GS}$ is '3V', the gate-source voltage $V_{GS}$ is smaller than the threshold voltage $V_T$, such that the D-S switch of the switching element SW becomes in a cut-off state.

In the instant case, the current value of the current $I_D$ flowing through the D-S switch of the switching element SW becomes '0A'. However, the current value of the clutch current becomes the current value 'I3' of the current determined by the resistor Rx connected in parallel with the switching element SW (Case 3, the second switching operation state). That is, the current value of the clutch current, as $I3 = V_{BATT}/Rx$, is determined through the relationship between the driving voltage and the resistor Rx. Herein, I3 corresponds to the minimum value in comparing I1 and I2.

Meanwhile, a clutch current control circuit 20 of FIG. 11, as a circuit independent of the ECV current control circuit using a small current (smaller than 1A), is a circuit for controlling the clutch current by use of a large current (1A or more).

The clutch current control circuit 20 provides by integrating the first strain gauge R1 and the second strain gauge R2 inside the electric control valve 10, but it is not necessary to provide by integrating the switching element SW and the resistor Rx inside the electric control valve 10. The switching element SW and the resistor Rx may be mounted at the installation position (i.e., a clutch current applying portion 30) of the built-in diode for preventing the transient voltage (see FIG. 13). This can provide the degree of freedom of the design according to the package configuration of the compressor itself.

Figure 13:
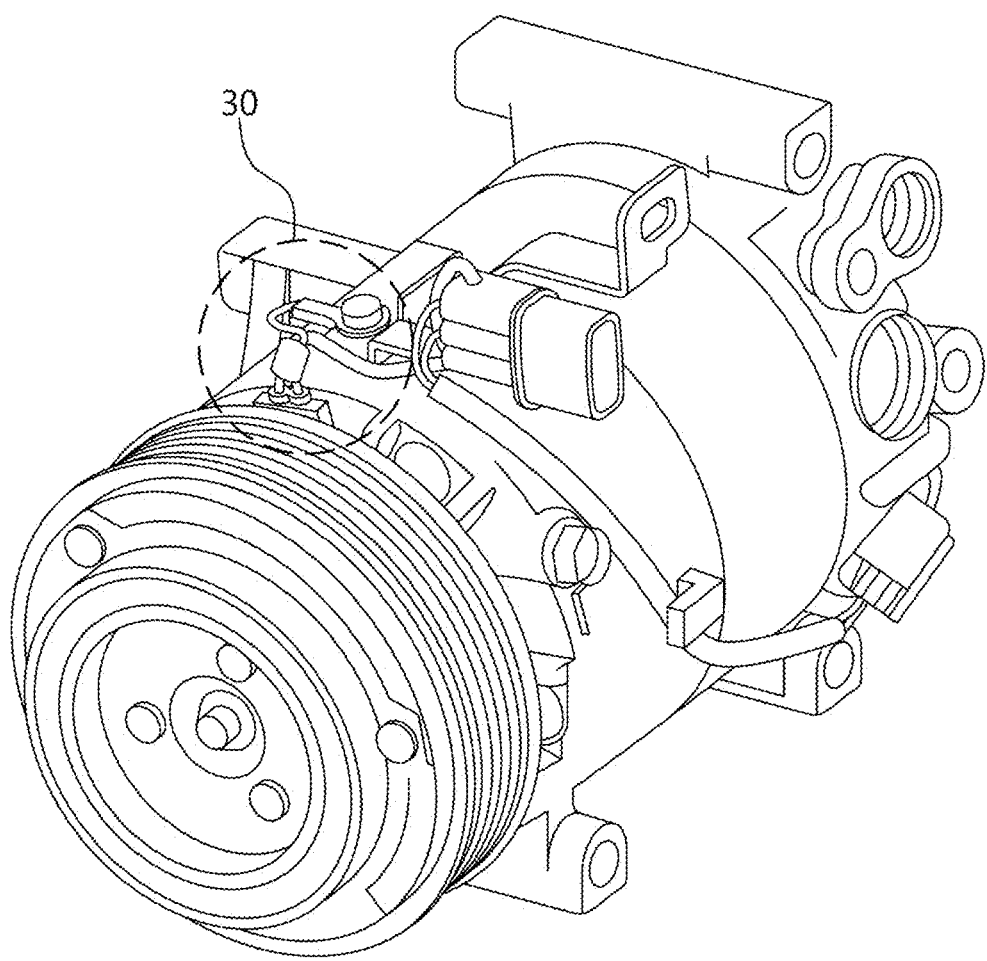
FIG. 13 is a diagram explaining the installation position of a built-in diode.

FIG. 13 is a diagram explaining the installation position of the built-in diode.

Furthermore, in general, a connector of the clutch type external variable compressor has three pins, and the clutch current control circuit 20 can also be implemented by holding three pins. Specifically, three pins of the clutch current control circuit 20 may be implemented with ECV(+), ECV(−), and BAT(+). This is a state in which a signal for the clutch current control is not required separately, and it is compatible with the conventional system.

FIG. 14 is a diagram explaining the characteristic for each case of FIG. 11 and FIG. 12.

Referring to FIG. 14, a Case 1 is a case where the movement amount of the ECV shaft 12 is 0 mm, the compressor swash plate angle 41 is the maximum swash plate angle, and the compressor torque is the maximum torque. At the instant time, it is a state in which the current value of the clutch current 42 is the maximum as 'I1' which is the current flowing through the D-S switch, and the clutch suction force 43 is the maximum.

Furthermore, a Case 3 is a case where the movement amount of the ECV shaft 12 is 4 mm, the compressor swash plate angle 41 is the minimum swash plate angle, and the compressor torque is the minimum torque. At the instant time, it is a state in which the current value of the clutch current 42 is the minimum as 'I3' which is the current flowing through the resistor Rx, and the clutch suction force 43 is the minimum.

Figure 15A:
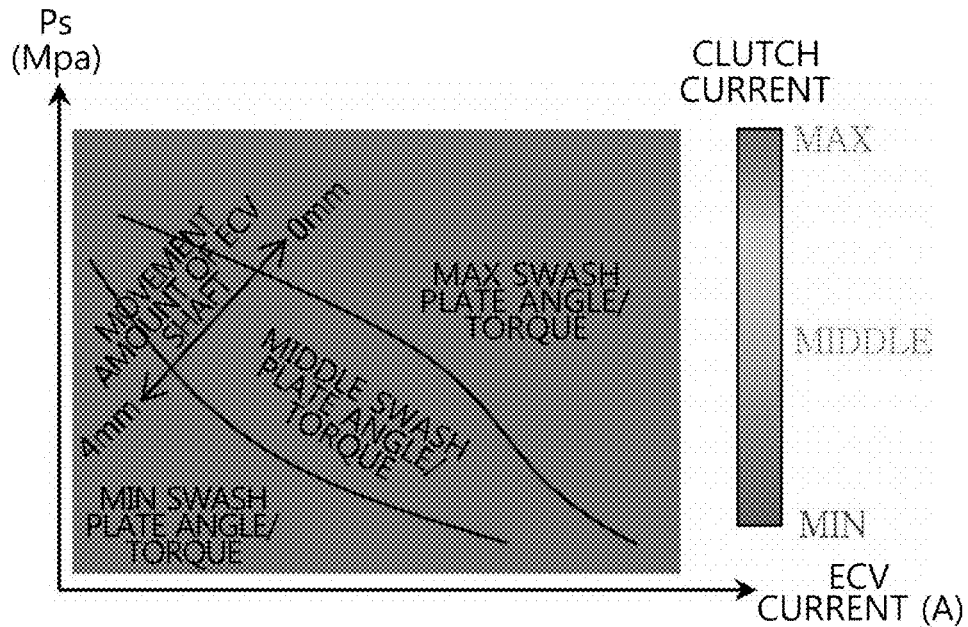
FIG. 15A and FIG. 15B are diagrams explaining the clutch current state in the ECV characteristic curve.
Figure 15B:
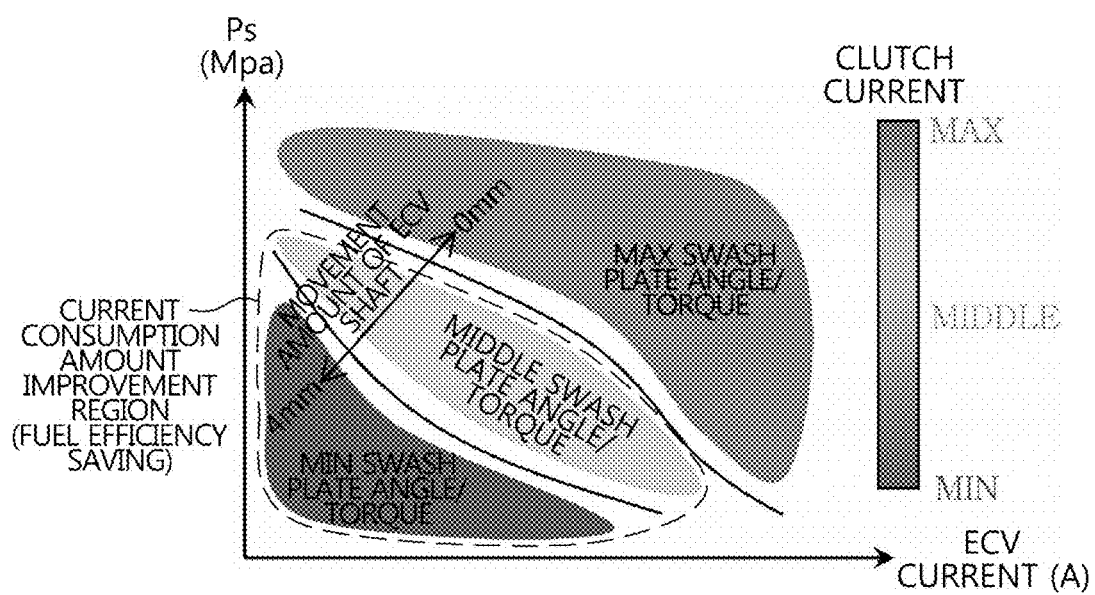
Figure 16A:
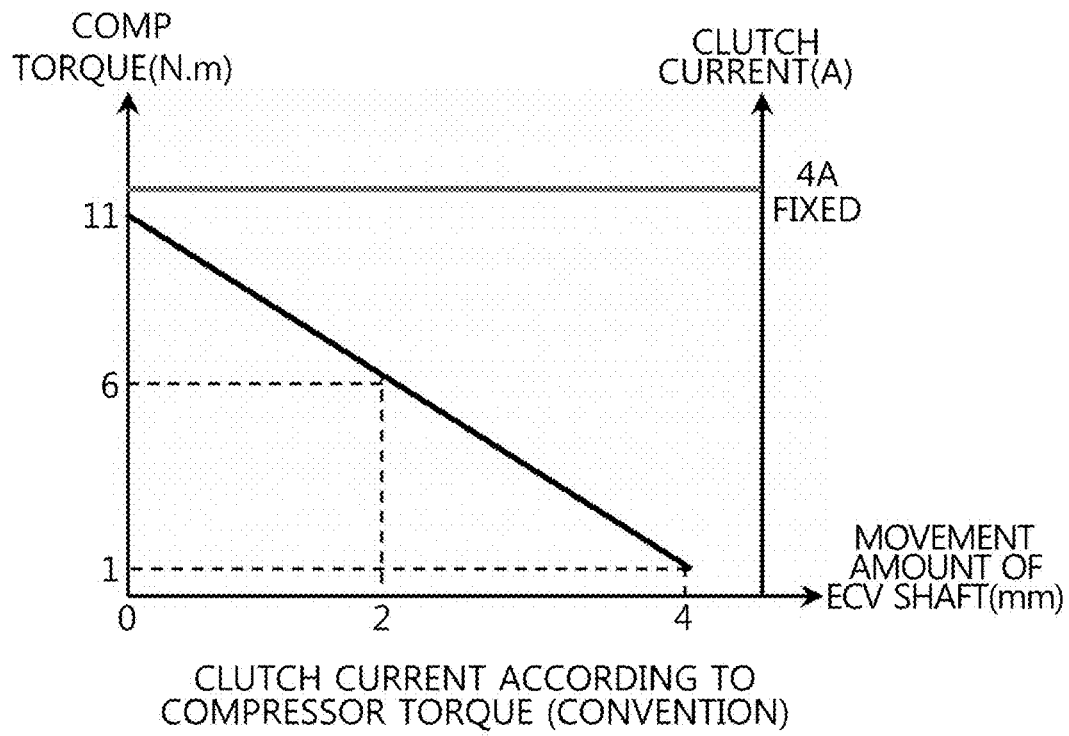
FIG. 16A and FIG. 16B are diagrams illustrating graphs for the clutch current state of FIG. 15A and FIG. 15B.
Figure 16B:
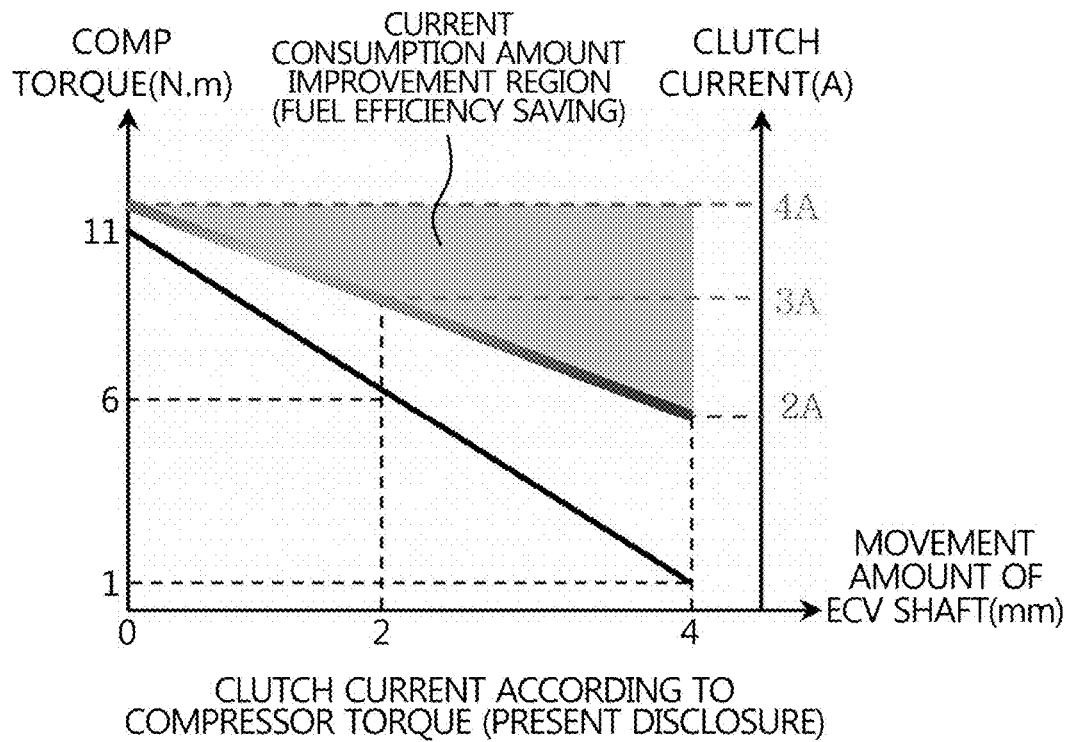

FIG. 15A and FIG. 15B are diagrams explaining the clutch current state in the ECV characteristic curve, and FIG. 16A and FIG. 16B are diagrams illustrating graphs for the clutch current state in FIG. 15A and FIG. 15B.

Referring to FIG. 15A and FIG. 15B, it is divided into the maximum swash plate angle/torque region, the middle swash plate angle/torque region, and the Min swash plate angle/torque region according to the movement amount of the ECV shaft 12 in the ECV characteristic curve. In the instant case, the maximum current of the clutch current is conventionally applied in the entire region regardless of the swash plate angle/torque of the compressor (see FIG. 15A).

However, in an exemplary embodiment of the present invention, a different current of the clutch current is applied according to the swash plate angle/torque of the compressor (see FIG. 15B). That is, the maximum current of the clutch current is applied in the Max swash plate angle/torque region, and the minimum current of the clutch current is applied in the Min swash plate angle/torque region.

Referring to FIG. 16A and FIG. 16B, the swash plate angle/torque of the compressor reduces as the movement amount of the ECV shaft 12 increases. The compressor torque is 11 N·m when the movement amount of the ECV shaft 12 is 0 mm, and the compressor torque is 1 N·m when the movement amount of the ECV shaft 12 is 4 mm.

However, in FIG. 16A, the clutch current has a constant current value 4A regardless of a change in the swash plate angle/torque of the compressor.

On the other hand, in FIG. 16B, the clutch current varies according to the change in the swash plate angle/torque of the compressor. That is, the current value of the clutch current is 4 A when the compressor torque is 11 N·m, the current value of the clutch current is 3 A when the compressor torque is 6 N·m, and the current value of the clutch current is 2 A when the compressor torque is 1 N·m.

As described above, the clutch current may be controlled together according to the movement amount of the ECV shaft 12 of the electric control valve 10 for controlling the swash plate angle/torque of the compressor.

Therefore, as in FIGS. 15B and 16B, the current consumption amount improvement region improves the efficiency of the vehicle and saves the fuel efficiency thereof. For example, assuming that the fuel efficiency is improved by 0.1% when the consumption current of 1 A is improved, the fuel efficiency may be improved by 0.2% at a maximum when the air conditioner is in an on state.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A clutch current control circuit for controlling a current of a clutch connected to a compressor, the clutch current control circuit comprising:
   a strain gauge, wherein a resistance value of the strain gauge is varied according to movement amount of an electric control valve (ECV) shaft of an electric control valve, wherein the strain gauge is mounted to the ECV shaft;
   a switching element of performing a switching operation by comparing a gate-source voltage determined according to a change in the resistance value of the strain gauge and a predetermined threshold voltage, and allowing a flow of a first clutch current to generate by a first switching operation state; and
   a resistor connected in parallel with the switching element, and allowing a flow of a second clutch current to generate by a second switching operation state of the switching element.

2. The clutch current control circuit of claim 1, wherein the strain gauge includes:
   a first strain gauge disposed at an opposite side of a valve opening and closing portion of the ECV, and increasing in the resistance value of the first strain gauge in being tensioned while the ECV shaft moves to a valve opening and closing side; and
   a second strain gauge disposed at the valve opening and closing side, and reducing in the resistance value of the second strain gauge in being compressed while the ECV shaft moves to the valve opening and closing side,
   wherein the first strain gauge and the second strain gauge are connected in series with each other.

3. The clutch current control circuit of claim 2, wherein a total sum of the resistance values of the first strain gauge and the second strain gauge is kept constant.

4. The clutch current control circuit of claim 3, wherein one of the first strain gauge and the second strain gauge is a general resistor having a constant resistance value regardless of a movement of the ECV shaft.

5. The clutch current control circuit of claim 2, wherein the gate-source voltage of the switching element corresponds to a voltage between the first strain gauge and the second strain gauge, and is determined by the resistance value of the first strain gauge and the resistance value of the second strain gauge.

6. The clutch current control circuit of claim 1, wherein the switching element is an N-channel enhancement MOSFET.

7. The clutch current control circuit of claim 1, wherein the first switching operation state is a state in which in the switching element, the gate-source voltage is equal to or more than the predetermined threshold voltage in a saturation region, and a D-S switch is in an on state, and
   wherein the second switching operation state is a state in which in the switching element, the gate-source voltage is smaller than the predetermined threshold voltage in the saturation region, and the D-S switch is in a cut-off state.

8. The clutch current control circuit of claim 1,
wherein a current value of the first clutch current is changed according to a magnitude of the gate-source voltage.

9. The clutch current control circuit of claim 1, further including:
a battery for supplying a driving voltage required for an operation of the switching element,
wherein the second clutch current is determined through a relationship between the resistor and the driving voltage.

10. The clutch current control circuit of claim 1,
wherein a current value of the second clutch current is a minimum value in comparing with a current value of the first clutch current.

11. The clutch current control circuit of claim 10,
wherein the second clutch current is a current applied to a coil of the clutch when the compressor has a minimum swash plate angle.

12. The clutch current control circuit of claim 1,
wherein the strain gauge is mounted by integrating inside an electric control valve, and
wherein the switching element and the resistor are mounted to an external clutch current applying portion of the electric control valve.

13. An electric control valve having a clutch current control circuit for controlling a current of a clutch connected to a compressor, the clutch current control circuit comprising:
a strain gauge, wherein a resistance value of the strain gauge is varied according to movement amount of an electric control valve (ECV) shaft of the electric control valve, wherein the strain gauge is mounted to the ECV shaft;
a switching element of performing a switching operation by comparing a gate-source voltage determined according to a change in the resistance value of the strain gauge and a predetermined threshold voltage, and allowing a flow of a first clutch current to generate by a first switching operation state; and
a resistor connected in parallel with the switching element, and allowing a flow of a second clutch current to generate by a second switching operation state of the switching element.

\* \* \* \* \*